United States Patent
Barton

(10) Patent No.: US 6,405,131 B1
(45) Date of Patent: Jun. 11, 2002

(54) METHOD AND SYSTEM FOR PROVIDING ROUTE GUIDANCE WITH MULTIPLE PROGRESS BARS

(75) Inventor: Mark Barton, Schaumburg, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/577,414

(22) Filed: May 22, 2000

(51) Int. Cl.[7] ............................................. G01C 21/30
(52) U.S. Cl. .................... 701/211; 701/201; 701/209; 340/988; 340/990; 340/995
(58) Field of Search ................................ 701/200, 207, 701/208, 209, 210, 211, 201; 340/988, 990, 995

(56) References Cited

U.S. PATENT DOCUMENTS

| | | | | |
|---|---|---|---|---|
| 4,937,570 A | * | 6/1990 | Matsukawa et al. | 340/905 |
| 5,243,528 A | * | 9/1993 | Lefebvre | 701/211 |
| 5,587,911 A | * | 12/1996 | Asano et al. | 701/211 |
| 5,757,289 A | * | 5/1998 | Nimura et al. | 340/995 |
| 5,938,718 A | * | 8/1999 | Morimoto et al. | 701/201 |
| 6,018,697 A | * | 1/2000 | Morimoto et al. | 701/209 |
| 6,021,372 A | | 2/2000 | Harrington | 701/209 |
| 6,076,041 A | * | 6/2000 | Watanabe | 701/211 |

* cited by examiner

Primary Examiner—Jacques H. Louis-Jacques
(74) Attorney, Agent, or Firm—Frank J. Kozak; Lawrence M. Kaplan

(57) ABSTRACT

A feature provided by a navigation system to provide guidance to a driver of a vehicle. The feature comprises multiple progress bars displayed on a display screen of the navigation system. The multiple progress bars feature is displayed when the vehicle is approaching a location at which a maneuver, such as a turn, onto a road is to be made and another road is close by and might be confused with the road onto which the maneuver should be made. One of the multiple progress bars represents the vehicle's approach toward the road onto which the maneuver should be made and the other of the multiple progress bars represents the vehicle's approach toward the road not to be taken. As the vehicle approaches both roads, the progress bars are updated indicating the vehicle's relative approach to both the road onto which the maneuver should be made and the road not to be taken. The multiple progress bars feature provides meaningful information to the driver in a clear and unambiguous way thereby assisting the driver to make the proper maneuver.

25 Claims, 6 Drawing Sheets

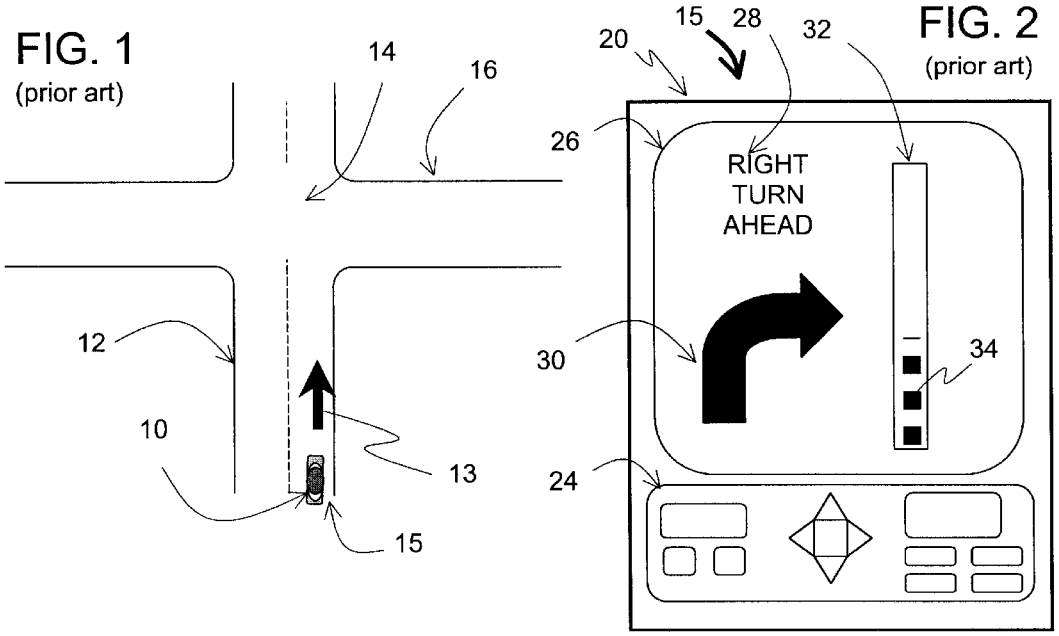
FIG. 1 (prior art)
FIG. 2 (prior art)
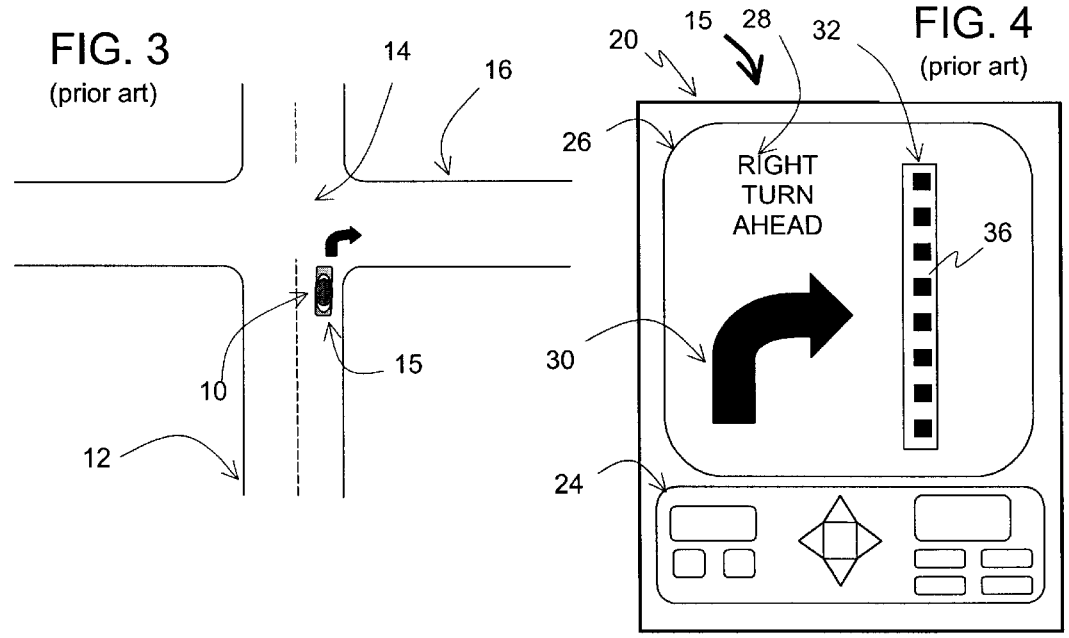
FIG. 3 (prior art)
FIG. 4 (prior art)

METHOD AND SYSTEM FOR PROVIDING ROUTE GUIDANCE WITH MULTIPLE PROGRESS BARS

BACKGROUND OF THE INVENTION

The present invention relates to navigation systems and more particularly the present invention relates a feature provided by a navigation system to advise a driver about the proper maneuver to make at an intersection as the intersection is being approached.

Navigation systems provide useful features, such as calculating a route to a desired destination and providing guidance for following the route. In order to provide these features, navigation systems use geographic data that include information about the locations of roads and intersections, estimated travel times along road segments, the speed limits along roads, etc. Using these kinds of geographic data, programming algorithms included in navigation systems can find an optimal (e.g, fastest or shortest) route to a specified destination.

Although navigation systems provide useful features, there still exists room for improvements. One area in which there is room for improvement relates to how a navigation system provides route guidance to a driver. When providing route guidance, it is preferable that a navigation system provide clear, unambiguous instructions that are easily understandable by the driver, but not distracting.

One type of instruction that navigation systems are required to provide is advice about making turns. As an example, one approach employed by an exemplary type of navigation system to indicate an upcoming required turn maneuver is described in connection with FIGS. 1–4. FIG. 1 shows a vehicle 10 traveling along a road 12 in the direction indicated by the arrow 13. The vehicle 10 is traveling toward an intersection 14. According to this example, a vehicle navigation system 15 located in the vehicle 10 has calculated a route and is providing guidance to the driver to follow the route. According to the calculated route, a turn should be made at the intersection 14 onto the road 16. FIG. 2 illustrates a user interface 20 of the navigation system 15 located in the vehicle 10. The user interface 20 includes input controls 24, which may include a keypad, buttons, a toggle, etc. The user interface 20 also includes a display screen 26. The navigation system 15 provides route guidance using visual instructions portrayed on the display screen 26. The route guidance may include textual instructions 28, e.g., "RIGHT TURN AHEAD." The route guidance may also include a graphic 30, e.g., an arrow, to indicate that a turn is required ahead. The navigation system 15 may also provide audible instructions or an audible reminder, e.g., a chime sound, that accompanies the presentation of visual route guidance information on the display screen 26.

In the navigation system 15 shown in FIG. 2, the route guidance also provides a "progress bar" 32 to indicate an upcoming required maneuver. The "progress bar" 32 is a rectangular graphic that the navigation system displays on the display screen 26. The progress bar 32 first appears as an empty vertical rectangle when the vehicle is a predetermined time (e.g., 10 seconds) or distance (e.g., 100 meters) from the intersection at which the required maneuver is to be made. As the vehicle approaches the location of the required maneuver, the progress bar 32 progressively "fills in." The "filling in" is indicated by a change of color, i.e., the "empty" progress bar progressively becomes "full." A comparison of FIGS. 2 and 4 illustrates operation of the progress bar 32. FIG. 2 shows the progress bar 32 when the vehicle 10 is at the location indicated in FIG. 1. As shown in FIG. 2, the progress bar 32 is partially filled in, as shown at 34, indicating that there still is some distance to go to the required maneuver. FIG. 4 shows the progress bar 32 when the vehicle 10 is at the location indicated in FIG. 3. As shown in FIG. 4, the progress bar 32 is almost completely filled in, as shown at 36, indicating that the vehicle is immediately at the location at which the required maneuver is to be made.

As illustrated by the foregoing example, advice about making a turn can be relatively easy if the road geometry is simple, i.e., there is only one road onto which the turn can be made. However, if the road geometry is complex, it can be difficult to provide clear, unambiguous instructions. For example, there may be another road close to the road onto which the required turn is to be made. FIG. 5 shows an example of such a complex road geometry. When there are two roads close together onto which the driver can turn, it can be difficult for the navigation system to provide the driver with clear, unambiguous instructions that indicate onto which of the roads the turn should be made. The driver may see both roads and not know which road to take, even with the visual and audio instructions, such as the progress bar, provided by the navigation system. If the instructions are not clear, the driver may mistakenly turn onto the incorrect road.

With some navigation systems, a map can be displayed on the display screen. The map may provide some context to the driver. For instance, the driver can see from the map that there are two possible turns close together and that the second turn is the one to be taken. Unfortunately, a map display can sometimes present too much information for route guidance. For example, the map should be drawn to scale, the vehicle position and movement should be depicted, the shapes of the roads should be represented accurately, nearby roads should be depicted even if they are not relevant to the turn to be taken, and map orientation should be correct. In addition, with a map display, street names should be displayed. However, street names may be difficult to read. Further, it may be difficult to associate street names with the proper roads on the navigation system map display, especially if the two roads are close together. All these factors may make it difficult to provide clear, unambiguous route guidance with a navigation system map display when a required maneuver is at a complex intersection.

Accordingly, there exists a need to provide better route guidance with a navigation system.

SUMMARY OF THE INVENTION

To address these and other objectives, the present invention comprises a feature provided by a navigation system to provide guidance to a driver of a vehicle. The feature comprises multiple progress bars displayed on a display screen of the navigation system. The multiple progress bars feature is displayed when the vehicle is approaching a location at which a maneuver, such as a turn, onto a road is to be made and another road is close by and might be confused with the road onto which the maneuver should be made. One of the multiple progress bars represents the vehicle's approach toward the road onto which the maneuver should be made and the other of the multiple progress bars represents the vehicle's approach toward the road not to be taken. As the vehicle approaches both roads, the progress bars are updated indicating the vehicle's relative approach to both the road onto which the maneuver should be made and the road not to be taken. The multiple progress bars feature provides meaningful information to the driver in a clear and unambiguous way, thereby assisting the driver to make the proper maneuver.

BRIEF DESCRIPTION OF THE DRAWINGS

FIG. 1 illustrates a vehicle approaching an intersection at which a (prior art) navigation system in the vehicle advises a turn is to be made to follow a calculated route.

FIG. 2 illustrates the user interface of the (prior art) navigation system in the vehicle of FIG. 1 when the vehicle is at the position shown in FIG. 1.

FIG. 3 illustrates the vehicle of FIG. 1 at a location closer to the intersection at which the (prior art) navigation system in the vehicle advises that a turn is to be made.

FIG. 4 illustrates the user interface of the (prior art) navigation system in the vehicle of FIG. 3 when the vehicle is at the location shown in FIG. 3.

DETAILED DESCRIPTION OF THE PRESENTLY PREFERRED EMBODIMENTS

A present embodiment is a feature for a navigation system whereby guidance for making turns is provided more clearly than with prior navigation systems. The present embodiment has particular applicability to the situation in which the vehicle for which the navigation system is providing guidance is approaching a complex intersection at which a maneuver, such as a turn, is to be made onto one of two or more closely-spaced roads.

According to the present embodiment, when route guidance is being provided about a driving maneuver to be taken at an upcoming intersection and there are multiple roads that might be confusing to the driver, the navigation system provides multiple progress bars, one for each of the roads. In the case where there is a second road closely spaced spaced to the road onto which a required turn is to be made, the navigation system displays two progress bars. One of the progress bars is for the desired road (i.e., the road onto which the driver should turn to follow the calculated route). The other progress bar is for the road to be avoided. The progress bars are visually distinguishable in a prominent way. For instance, the progress bar that represents the road to avoid might be gray, with a "shadowy" appearance or might have a red "X" placed over it. The progress bar that represents the road to take might be green. The two progress bars would both be vertically oriented, side-by-side.

According to the present embodiment, the multiple progress bars would both progressively "fill in" as the vehicle approaches the roads they represent. Thus, the multiple progress bars would visually represent the relative progress of the vehicle toward both the road onto which the turn should be made as well the road to be avoided. Assume that the first possible right turn is the road to be avoided and the second possible right turn is the road to take. As the driver approaches the first possible right turn, the navigation system shows the progress bar that represents the road to be avoided approaching 100%. Simultaneously, the navigation system shows the progress bar that represents the road to take as lagging behind, perhaps at only 93%. As the driver nears the first intersection, the driver can readily understand from the display that a turn should not be made at the first road and that he/she should continue driving along to the second road. As the vehicle passes the first road, the progress bar representing the first road disappears, leaving only the progress bar that represents the road onto which the turn should be made. This progress bar representing the road to take would now be almost at 100%, assuring the driver that the correct decision has been made.

Figure 5:
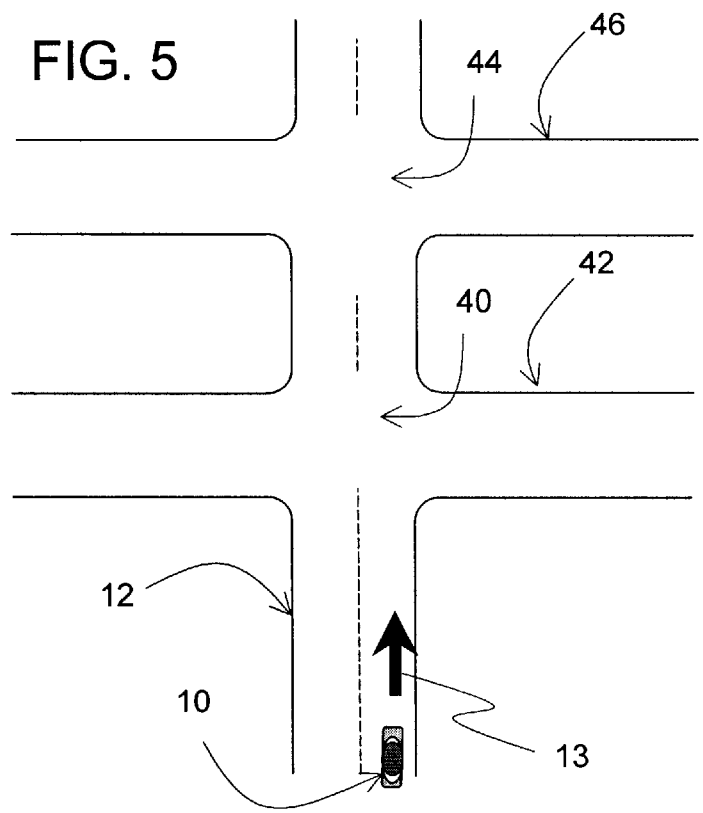
FIG. 5 illustrates a vehicle approaching a complex intersection.
Figure 6:
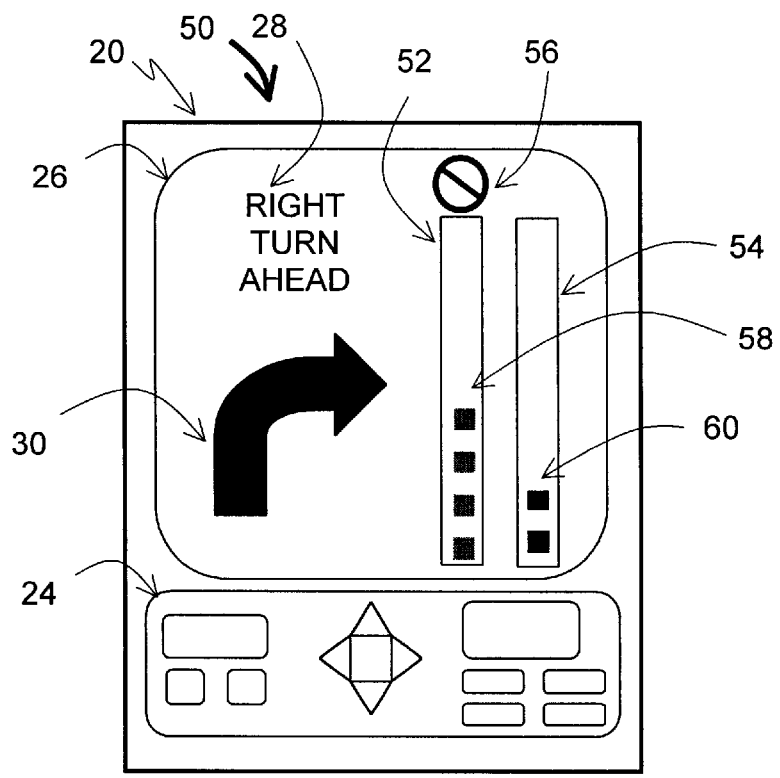
FIG. 6 illustrates the user interface of a navigation system according to a first embodiment.

FIG. 6 illustrates a user interface of a navigation system 50 that incorporates the present embodiment. The navigation system 50 in FIG. 6 includes similar components as the navigation system 15 described above in connection with FIGS. 1–4 wherein like numerals indicate similar components. For purposes of describing the present embodiment, the navigation system 50 is assumed to be in the vehicle 10 approaching the intersection 40 shown in FIG. 5. According to this example, the route calculated by the navigation system calls for turning right at the intersection 44 onto the road 46. Located close to the intersection 44 is another intersection 40 at which a right turn can be made onto the road 42.

As shown in FIG. 6, the navigation system 50 includes twin progress bars 52 and 54 on the display 26. The twin progress bars 52 and 54 are used to represent the vehicle's approach toward the complex road geometry comprised of the intersections 40 and 44. The progress bars 52 and 54 are distinguishable from each other so that the driver can easily tell one from the other. The progress bar 52 represents the road not to be taken, i.e., 42 and the progress bar 54 represents the road to be taken, i.e., 44. In the embodiment of FIG. 6, one of the progress bars 52 is associated with an indication 56 that it represents the road not to be taken. In FIG. 6, the indication 56 is a circle with a line through it. The progress bar 52 that represents the road not to be taken may also be distinguished by color, e.g., the progress bar 52 may be red or gray. The other progress bar 54 represents the road to be taken. The progress bar 54 that represents the road to be taken may be a different color, e.g., green or black, than the progress bar 52 that represents the road not to be taken.

As the vehicle approaches the intersections 40 and 44, each of the progress bars 52 and 54 progressively fills in. The progress bar 52 that represents the road not to be taken is more filled in, as shown at 58, compared to the progress bar 54 that represents the road to be taken, as shown at 60. The relative amounts by which the progress bars 52 and 54 are filled in, combined with the indication that one of them represents a road not to be taken, provides clear guidance to the driver regarding the proper maneuver to be taken at the upcoming intersections.

Figure 7:
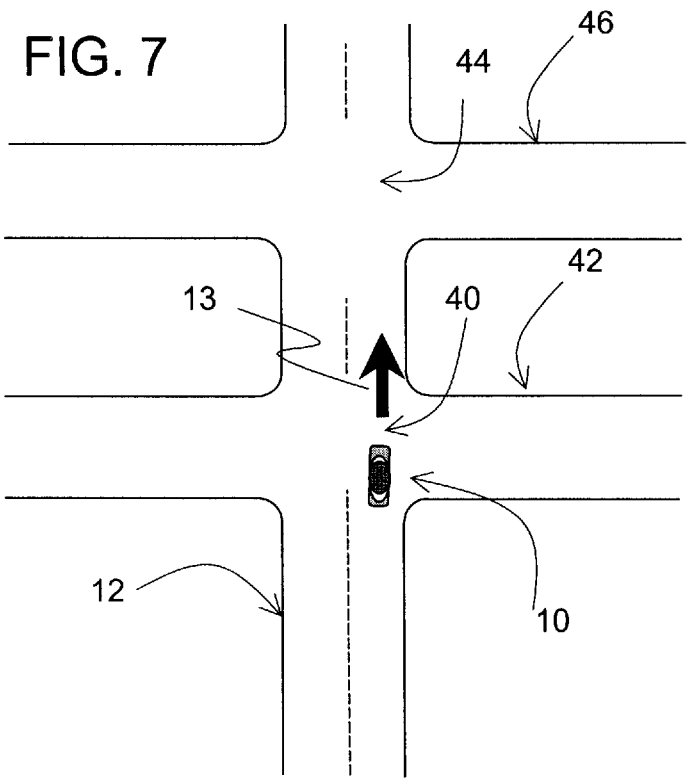
FIG. 7 is an illustration similar to FIG. 5 showing the vehicle at another location as it approaches a complex intersection at which the navigation system in the vehicle advises a turn is to be made to follow a calculated route.
Figure 8:
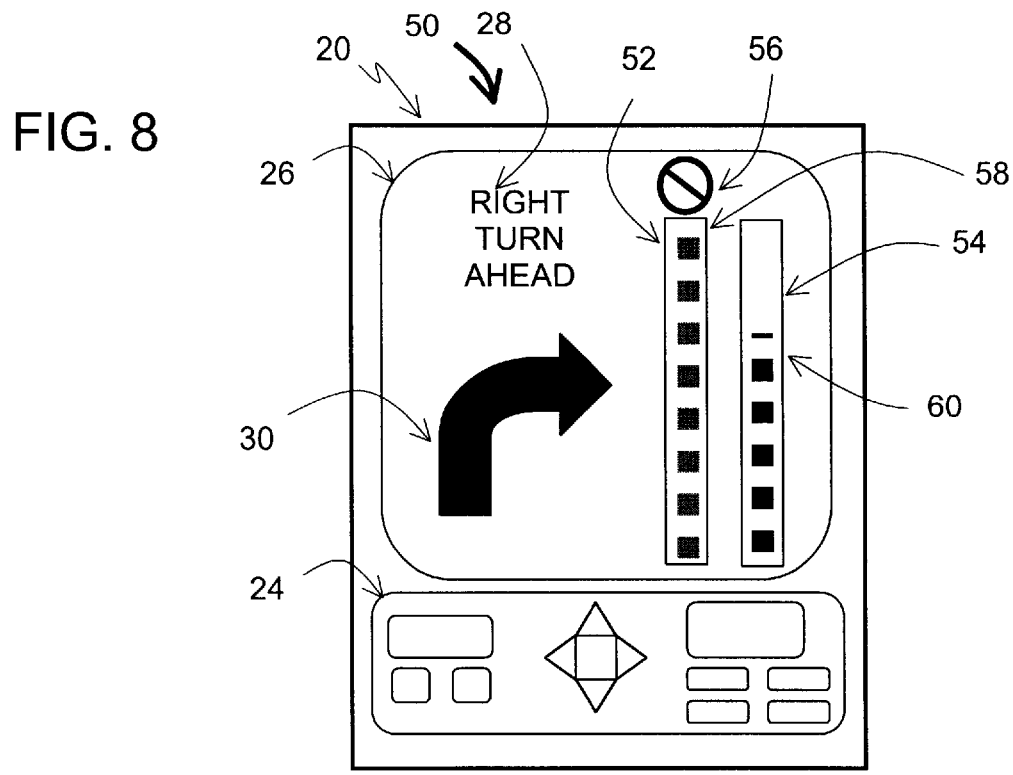
FIG. 8 illustrates the user interface of the navigation system of FIG. 6 when the vehicle is at the position shown in FIG. 7.

FIG. 7 shows the vehicle 10 at the intersection 40 with the road 42 not to be taken. FIG. 8 illustrates the user interface 20 of the navigation system 50 when the vehicle is at the position indicated in FIG. 7.

Figure 9:
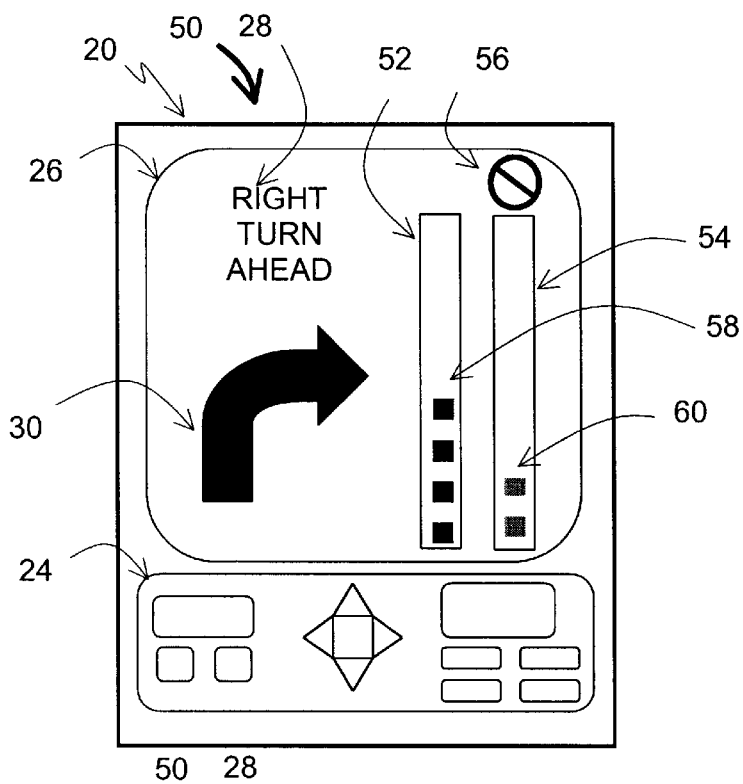
FIG. 9 shows the user interface of the navigation system of FIG. 6 when the vehicle is at the position shown in FIG. 5, but following a different route.
Figure 10:
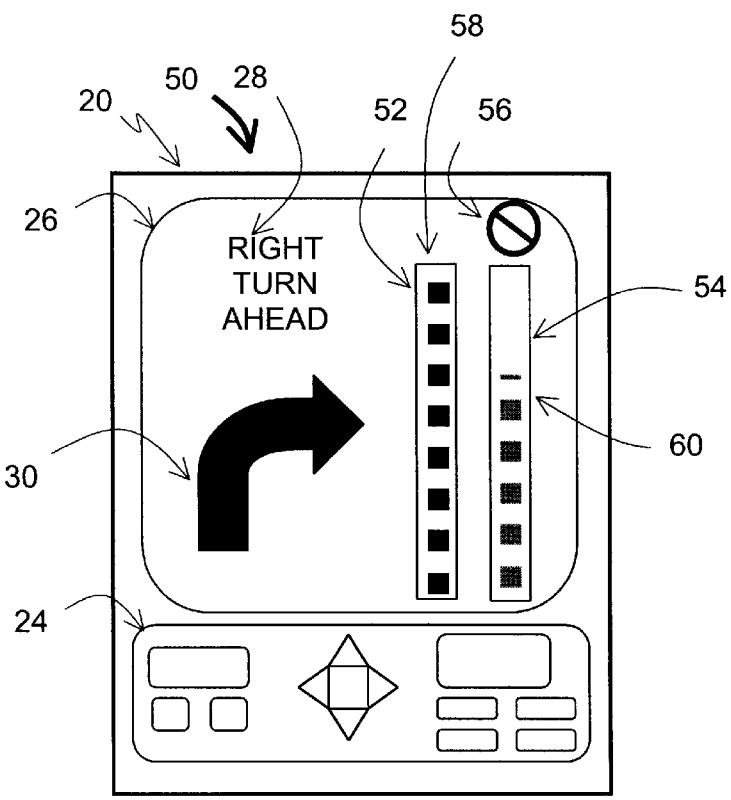
FIG. 10 shows the user interface of the navigation system of FIG. 6 when the vehicle is at the position shown in FIG. 7, but following the route being followed in FIG. 9.

For purposes of further illustration, suppose that the route calculated by the navigation system 50 called for turning right at the intersection 40 instead of at the intersection 44. FIG. 9 shows how the navigation system would present the progress bars 52 and 54 when the vehicle is at the position indicated in FIG. 5 if the route calculated by the navigation system called for turning right at the intersection 40 instead of at the intersection 44. FIG. 10 shows how the navigation system would present the progress bars 52 and 54 when the vehicle is at the position indicated in FIG. 7 if the route calculated by the navigation system called for turning right at the intersection 40 instead of at the intersection 44.

EXAMPLE

Figure 11:
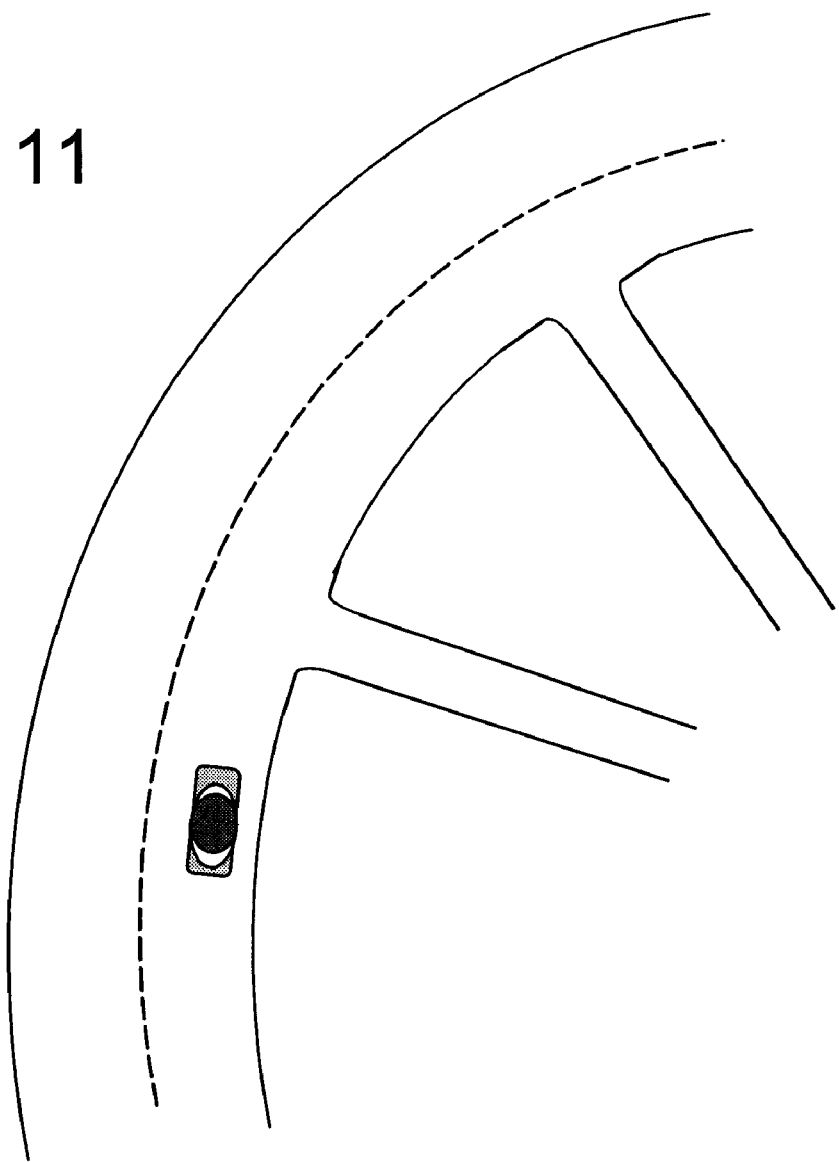
FIG. 11 illustrates another road geometry configuration for which the navigation system of FIG. 6 with the multiple progress bar feature can provide guidance.

FIG. 11 shows a case in which there are two closely spaced right turns, but they are on a curved road, so the driver in a vehicle on the curved road can only see the first one as the turns are being approached. Assume that a navigation system in the vehicle has calculated a route that calls for turning right at the second of the two right turns. With a prior navigation system (like the one shown in FIGS. 2 and 4), the driver has to decide as the first intersection is being approached whether to turn at the first intersection even though it may seem a bit premature, or to continue around the curve and see if there is another intersection. The embodiment shown in FIG. 6 overcomes this problem. With the embodiment of FIG. 6, the driver see the progress bar for the road not to be taken approaching 100% as the first right turn is being approached, while the progress bar for the road to be taken is at say 93%. The navigation system of FIG. 6 provides useful information indicating that the first turn should not be taken and that the driver should proceed to the another intersection just around the bend.

Distinguishing which bar comes first

As mentioned above in connection with the embodiment of FIG. 6, it should be relatively easy for the driver to distinguish the progress bar that represents the road to be taken from the progress bar that represents the road not to be taken. Visual indicators can be used, such as color, a red X, etc. However, there is also the consideration of distinguishing which progress bar represents the road that comes first. Since the two roads may be close together, the two progress bars may differ by only a small amount visually. According to a preferred embodiment, the progress bars should be displayed consistently, left-to-right, with the one on the left corresponding to the intersection with the road that will be encountered first.

Right or left turns only

By convention, if the driver is looking for a right turn, progress bars will only be shown for roads that go to the right. Likewise, if the driver is looking for a left turn, progress bars will only be shown for roads that go to the left. The intent is to visually represent both the desired turn and the wrong turns that might be confused with the desired turn. Roads that branch off in the opposite direction from the desired road are not likely to be confused with the desired road and there is little need to use the multiple progress bars feature for such roads.

Advantages

Multiple progress bars are much simpler to understand than a map. The display is intuitive, even to a first time user.

The disclosed multiple progress bar feature provides the advantage that the driver will more likely follow the intended route. This will result in increased user satisfaction.

The disclosed multiple progress bar feature provides safety advantages. The user can mentally process the complex intersection several seconds before approaching such an intersection, and thus can approach the intersection with a clear understanding that (1) there is a choice of two possible turns and (2) which turn to take.

In addition, when the driver approaches an intersection, he/she does not have to be looking for turns further along the road, trying to see if there is another turn that might be the one to take. Instead, the driver can focus on the immediate traffic situation, confident that this turn (or the next turn, depending on the twin progress bar display) is the correct one. There is less chance of a wrong turn, which might result in an unsafe maneuver as the driver realizes the mistake and attempts to recover.

Alternatives

The embodiment described above can be extended to more than two progress bars if there are more than two possible turns. For example, if there are three possible turns, there would be three progress bars. The bars would be presented in a consistent order, e.g., with the bar for the nearest road presented on the left of the display and the bar for the furthest road presented on the right of the display. Each progress bar would disappear as the road is passed.

The use of side-by-side progress bars is a specific way to implement a more general concept. The more general underlying concept is that it is necessary to communicate to the driver not just about the desired road, but also about the roads that the driver should avoid. Using side-by side progress bars is one way to do this.

Exemplary implementation

Figure 12:
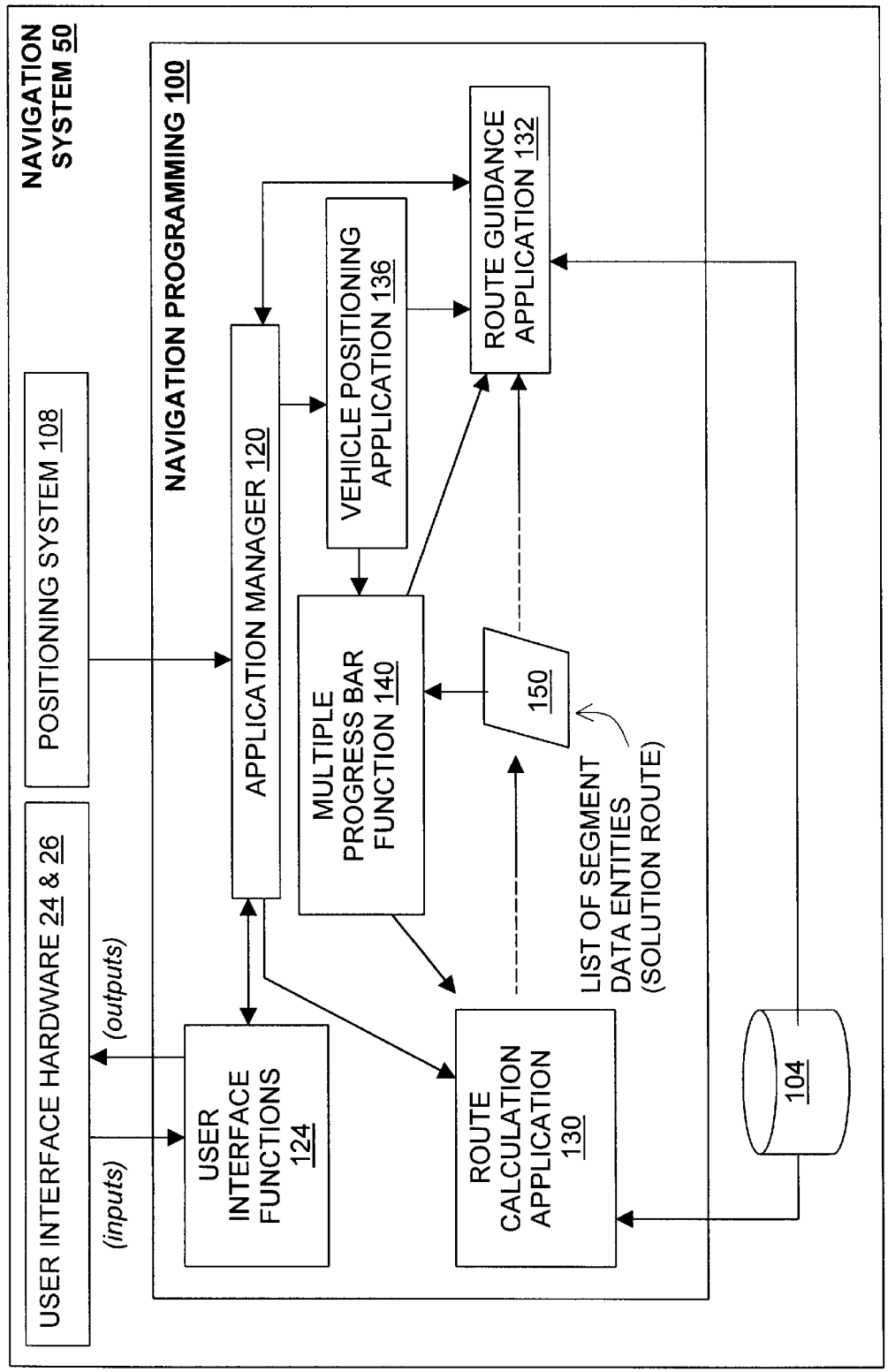
FIG. 12 is a block diagram showing software components of an exemplary embodiment of a navigation system that provides the multiple progress bars feature.

The multiple progress bar feature is provided by a software application or program in the navigation system. FIG. 12 shows an exemplary architecture for providing the multiple progress bar feature with the navigation system 50. Referring to FIG. 12, the navigation system 50 includes or uses navigation programming 100. The navigation programming 100 includes the software that provides for the functions and/or features performed by the navigation system 50. The navigation programming 100 uses geographic data 104 in conjunction with input from the driver via the user interface 24, and possibly in conjunction with outputs from a positioning system 108 (e.g., GPS, inertial sensors) to provide various navigation-related features and/or functions.

The navigation programming 100 may be stored in a non-volatile storage medium in the navigation system 50. Alternatively, the navigation programming 50 may be located at a remote location and may be provided to or accessed by the navigation system 50 over a wireless communications system.

In one embodiment, the navigation programming 100 may be written in any suitable programming language, such as C, C++, Java, Visual Basic, and so on. The navigation programming 100 may be formed of separate component applications (also referred to as programs, subprograms, routines, or tools). The component applications of the navigation programming 100 work together through defined programming interfaces. FIG. 12 shows some of the component applications for one embodiment of the navigation programming 100 included in the navigation system 50. In addition to the component programs shown in FIG. 12, the navigation programming 100 may include other component sub-routines or programs.

In FIG. 12, the navigation programming 100 is shown to include a navigation application manager 120. The navigation application manager 120 is a program or routine that provides for overall management of the functions of the navigation system 50. The navigation application manager 120 may also include support for and interfaces to the navigation system hardware, such as the positioning system 108 and the user interface 24. The navigation application manager 120 includes user interface functions 124 to interface with the user interface 24 and display 26. These user interface functions 124 may provide for presenting a menu to the end user on the screen display 26, accepting inputs from the end user via the user interface input devices 24, displaying results to the drive on the screen display 26, and so on.

The navigation programming 100 includes sub-programs or routines that interface with the navigation application manager 120 and that provide for specific navigation related features or functions to be performed by the navigation system. These sub-programs include a route calculation application 130, a route guidance application 132, and a vehicle positioning application 136. The navigation programming 100 may include other navigation applications in addition to these.

A multiple progress bar function 140 may be part of the route guidance application 132 or alternatively, the multiple progress bar function 140 may be a separate application. The multiple progress bar function 140 searches a route 150 calculated by the route calculation application 130 for required maneuvers that involve complex intersections. For example, the multiple progress bar function 140 searches the calculated route 150 for maneuvers in which a second road is close to a road onto which a turn is required, as shown in FIG. 5. When the vehicle approaches this type of maneuver, as determined by the vehicle positioning application 136, the multiple progress bar function 140 renders the multiple progress bars on the display screen 26, as described above. As the vehicle continues to approach the intersections, as determined by the vehicle positioning application 136, the multiple progress bar function 140 continue to fill in each of the progress bars relative to the degree that the vehicle is approaching each of the intersections.

It is intended that the foregoing detailed description be regarded as illustrative rather than limiting and that it is understood that the following claims including all equivalents are intended to define the scope of the invention.

I claim:

1. A method of providing guidance with a navigation system to a driver of a vehicle as the vehicle approaches a location at which a maneuver onto a first road is required to follow a calculated route and where a second road not to be taken is close to the first road, the method comprising:
    presenting information to the driver indicating that both the first road and the second road are being approached;
    presenting information to the driver indicating a relative proximity of the vehicle to each of said first road and said second road; and
    progressively updating the information indicating the relative proximity of the vehicle to each of said first road and said second road,
    wherein said information to the driver indicating that both the first road and the second road are being approached comprises a first progress bar representing said first road and a second progress bar representing said second road, wherein said first progress bar and said second progress bar are displayed on a display screen of said navigation system.

2. The method of claim 1 further comprising:
    presenting information to the driver indicating that the second road is not the road to be taken.

3. The method of claim 2 wherein said information indicating that the second road is not the road to be taken is indicated by color.

4. The method of claim 1 wherein the maneuver comprises a turn at a first intersection onto said first road from a third road upon which the vehicle is traveling.

5. The method of claim 4 wherein an intersection with said second road comes before the intersection with said first road as said vehicle approaches the maneuver.

6. The method of claim 1 wherein the maneuver comprises a turn at a first intersection onto said first road from a third road upon which the vehicle is traveling and wherein said second road is accessed by a turn at a second intersection onto said second road from the third road.

7. The method of claim 1 wherein said information to the driver indicating the relative proximity of the vehicle to each of said first road and said second road comprises a relative filling in of a first progress bar representing said first road and a second progress bar representing said second road, wherein said first progress bar and said second progress bar are displayed on a display screen of said navigation system.

8. The method of claim 7 wherein said step of progressively updating the information indicating the relative proximity of the vehicle to each of said first road and said second road comprises progressively filling in said first progress bar and said second progress bar as said vehicle approaches said first road and said second road.

9. The method of claim 7 wherein the progress bar representing whichever comes first of said first road and said second road is displayed left of the progress bar representing whichever comes second of said first road and said second road.

10. A method of providing guidance with a navigation system to a driver of a vehicle as the vehicle approaches a location at which a maneuver onto a first road is required to follow a calculated route and where a second road not to be taken is close to the first road, the method comprising:
    presenting information to the driver indicating that both the first road and the second road are being approached;
    presenting information to the driver indicating a relative proximity of the vehicle to each of said first road and said second road; and
    progressively updating the information indicating the relative proximity of the vehicle to each of said first road and said second road,
    wherein said information to the driver indicating the relative proximity of the vehicle to each of said first road and said second road comprises a relative filling in of a first progress bar representing said first road and a second progress bar representing said second road, wherein said first progress bar and said second progress bar are displayed on a display screen of said navigation system.

11. The method of claim 10 wherein said step of progressively updating the information indicating the relative proximity of the vehicle to each of said first road and said second road comprises progressively filling in said first progress bar and said second progress bar as said vehicle approaches said first road and said second road.

12. The method of claim 10 wherein the progress bar representing whichever comes first of said first road and said second road is displayed left of the progress bar representing whichever comes second of said first road and said second road.

13. The method of claim 10 further comprising:
    presenting information to the driver indicating that the second road is not the road to be taken.

14. The method of claim 13 wherein said information indicating that the second road is not the road to be taken is indicated by color.

15. The method of claim 10 wherein the maneuver comprises a turn at a first intersection onto said first road from a third road upon which the vehicle is traveling.

16. The method of claim 15 wherein an intersection with said second road comes before the intersection with said first road as said vehicle approaches the maneuver.

17. The method of claim 10 wherein the maneuver comprises a turn at a first intersection onto said first road from a third road upon which the vehicle is traveling and wherein said second road is accessed by a turn at a second intersection onto said second road from the third road.

18. A feature for a navigation system for a vehicle whereby guidance is provided to a vehicle driver when the vehicle approaches a location at which a maneuver onto a first road is required to follow a calculated route and where a second road not to be taken is close to the first road, the feature comprising:

information presented to the driver on a display of the navigation system that indicates that both the first road and the second road are being approached; and information presented to the driver on the display of the navigation system that indicates a relative proximity of the vehicle to each of said first road and said second road;

wherein said information to the driver indicating that both the first road and the second road are being approached comprises a first progress bar representing said first road and a second progress bar representing said second road, and wherein the information indicating the relative proximity of the vehicle to each of said first road and said second road are updated progressively.

19. The invention of claim 18 wherein said first progress bar and said second progress bar are vertically oriented.

20. The invention of claim 18 wherein said first progress bar and said second progress bar are side by side.

21. The invention of claim 18 wherein said first progress bar and said second progress bar are different colors.

22. A feature for a navigation system for a vehicle whereby guidance is provided to a vehicle driver when the vehicle approaches a location at which a maneuver onto a first road is required to follow a calculated route and where a second road not to be taken is close to the first road, the feature comprising:

information presented to the driver on a display of the navigation system that indicates that both the first road and the second road are being approached; and information presented to the driver on the display of the navigation system that indicates a relative proximity of the vehicle to each of said first road and said second road;

wherein said information to the driver indicating the relative proximity of the vehicle to each of said first road and said second road comprises a relative filling in of a first progress bar representing said first road and a second progress bar representing said second road, wherein said first progress bar and said second progress bar are displayed on a display screen of said navigation system, and wherein the information indicating the relative proximity of the vehicle to each of said first road and said second road are updated progressively.

23. The invention of claim 22 wherein said first progress bar and said second progress bar are vertically oriented.

24. The invention of claim 22 wherein said first progress bar and said second progress bar are side by side.

25. The invention of claim 22 wherein said first progress bar and said second progress bar are different colors.

* * * * *